United States Patent [19]
Hochstuhl et al.

[11] Patent Number: 5,831,753
[45] Date of Patent: Nov. 3, 1998

[54] OPTICAL FIBER TRANSMISSION SYSTEM

[75] Inventors: Gerhard Hochstuhl, Waldshut-Tiengen, Germany; Philippe Maibach, Brugg, Switzerland

[73] Assignee: Asea Brown Boveri AG, Baden, Switzerland

[21] Appl. No.: 696,477

[22] Filed: Aug. 14, 1996

[30] Foreign Application Priority Data

Oct. 27, 1995 [DE] Germany .................. 195 40 046.1

[51] Int. Cl.[6] .................................................. H04B 10/00
[52] U.S. Cl. .................................. 359/144; 319/173
[58] Field of Search ...................... 359/142, 144, 359/154, 173, 182, 188, 195, 110

[56] References Cited

U.S. PATENT DOCUMENTS

| | | | |
|---|---|---|---|
| 4,422,180 | 12/1983 | Wendt et al. | 359/144 |
| 4,994,675 | 2/1991 | Levin et al. | 359/110 |
| 5,416,623 | 5/1995 | Dawson et al. | 359/110 |

FOREIGN PATENT DOCUMENTS

| | | |
|---|---|---|
| 0334192A1 | 9/1989 | European Pat. Off. . |
| 0402295 | 12/1990 | European Pat. Off. . |
| 2751645 | 5/1979 | Germany . |
| 4223731A1 | 1/1994 | Germany . |
| 4333502A1 | 4/1994 | Germany . |
| 4421441A1 | 4/1995 | Germany . |
| 0087439 | 5/1986 | Japan ................................ 359/144 |

OTHER PUBLICATIONS

"LWL–System–komponenten auf dem Prufstand", Elektronik 21/1991, pp. 126–136.

*Primary Examiner*—Kinfe-Michael Negash
*Attorney, Agent, or Firm*—Burns, Doane, Swecker & Mathis, L.L.P.

[57] ABSTRACT

An optical fiber transmission system is specified which can be checked in a simple way for satisfactory power reserve. For this purpose, a transmission current ID is modulated with a frequency fT by switching over the current between a normal value IDN and a smaller test value IDT, which is not equal to zero.

3 Claims, 3 Drawing Sheets

OPTICAL FIBER TRANSMISSION SYSTEM

BACKGROUND OF THE INVENTION

1. Field of the Invention

The invention relates to the field of optoelectronics. More particularly, the invention relates to an optical fiber transmission system for transmitting control signals between a controller and a drive unit, for example of a drive control system of an electrically driven locomotive.

2. Background

Whether used in a locomotive or elsewhere, an optical fiber transmission system comprises at least one opto-transmitter and one opto-receiver which are connected via an optical fiber. Information, signals are transmitted via the optical fiber in a fashion which is fast, low-loss, noise-free and potential-free. Various wavelengths are used, depending on the requirements placed on the transmission link, for example 650 nm, 850 nm, 1300 nm, etc. Optical fiber transmission systems are used in a wide field of applications ranging from data transmission in air-conditioned spaces to signal transmission in traction applications which are exposed to large temperature fluctuations and vibration conditions in environments subject to heavy electromagnetic pollution and having large potential differences.

Optical fiber transmission systems certainly have indisputable advantages, but they also have some problematic aspects:

The transmitter power is subject to high manufacturing tolerance.

The transmitter power decreases with time (depending on wavelength, from scarcely detectable to very strong).

Optical fibers made from plastic age very quickly. In addition the aging is further promoted by strong temperature fluctuations.

The surface of the contact points of the optical fibers is scratched by frequent changing of the plugs, which additionally increases the attenuation.

The sensitivity of the receivers is likewise subject to high manufacturing tolerance.

The worst problem is posed by aging and the decreasing transmitter power. When designing an optical fiber transmission system, it must be ensured that, once calculated, the optical power reserve will still also be available after many years of use under severe conditions. The failure of an optical fiber link, for example owing to high attenuation of the optical fiber, can cripple entire systems. In particular, it is necessary, for example in the case of use in a locomotive, to reckon with impairment of the power or even with complete failure.

It would be desirable to have an optical fiber transmission system in which the optical power reserve could be determined in a simple way in a test mode.

SUMMARY OF THE INVENTION

It is therefore the object of the present invention to specify an optical fiber transmission system in which it can be determined in a test mode whether adequate optical power reserve is still present.

This object is achieved in an optical fiber transmission system according to the invention.

The core of the invention is thus that in a test mode of the optical fiber transmission system a supply circuit of the opto-transmitter modulates the transmission current with a prescribed frequency fT, in order to check the functioning of the optical fiber. The transmission current is preferably switched over in this case between a normal value IDN and a smaller test value IDT, which is not equal to zero, with the frequency fT. Also conceivable are other types of modulation with, for example, triangular or sinusoidal signal characteristics. If the attenuation of the optical fiber is too large, or if the transmitter power has decreased excessively, the test value IDT is interpreted in the receiver as "no optical signal", and an electric signal of frequency fT is thereby detected. Consequently, it can be concluded that there is at that time still an adequate optical power reserve from the fact that the receiver is outputting a continuous electric signal in the test mode. Given an appropriate selection of the test value IDT, detection of a periodic electric signal in the test mode signifies that the power reserve has been reached and the transmission system must undergo an inspection shortly.

A particularly advantageous feature of the invention is that it is recognized that a power reserve has been reached at an adequately early stage and before the system already can no longer be used. Moreover, checking can be undertaken without large scale modification of the system by simple matching of the drive. However, this presupposes that the evaluation circuit of the electrically converted receiver signals must be capable of detecting a signal of frequency fT.

BRIEF DESCRIPTION OF THE DRAWINGS

A more complete appreciation of the invention and many of the attended advantages thereof will be readily obtained as the same becomes better understood by reference to the following detailed description when considered in connection with the accompanying drawings, wherein.

Figure 1:
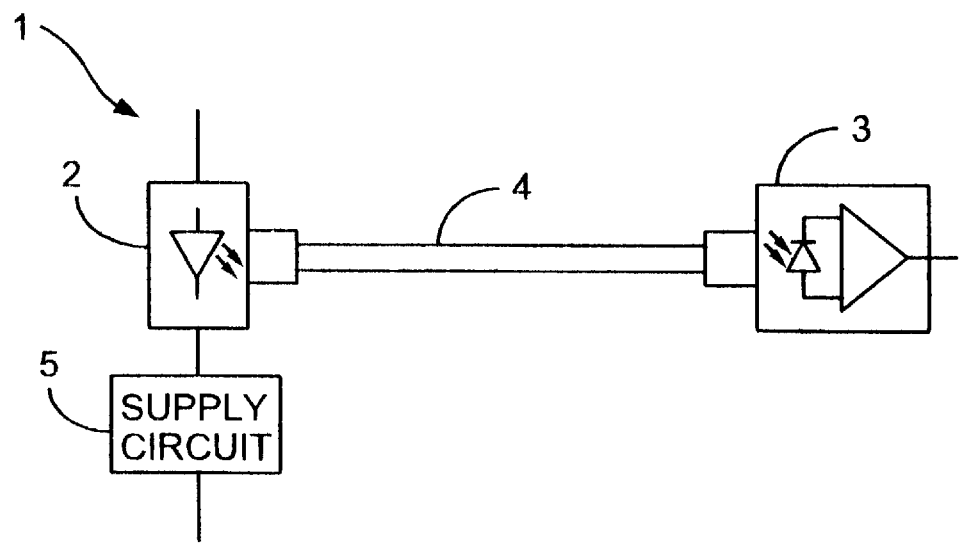
FIG. 1 shows a block diagram of an optical fiber transmission system.

The reference symbols used in the drawings are listed, together with their meaning, by way of summary in the list of designations.

DESCRIPTION OF THE PREFERRED EMBODIMENTS

Referring now to the drawings, wherein like reference numerals designate identical or corresponding parts throughout the several views, FIG. 1 shows an optical fiber transmission system 1 in a diagrammatic fashion. Said system comprises at least one opto-transmitter 2 and one opto-receiver 3, which are connected via an optical fiber 4. By driving a supply circuit 5 which outputs a transmission current ID, electric signals are converted by means of a transmitting diode into optical signals and transmitted via the optical fiber 4. These optical signals can be detected in the receiver 3. The signals are amplified in the receiver 3 and reconverted into digital electric signals. The electric signals correspond, for example, to information, control commands and the like.

The optical fiber 4 is subject to a natural, age-induced attenuation which, however, can be further intensified by extreme temperature fluctuations, for example. The power of the transmitter 2 can decrease sharply with time. As a result of the attenuation or the decreasing transmitter power, an optical signal is no longer correctly transmitted. This is interpreted in the transmitter as if no optical signal were present, and the receiver thus detects a digital zero instead of a one.

It is therefore also possible for parts of the traction control system of an electrically driven locomotive to be equipped with such optical fiber transmission systems. In particular, the signal transmission from the controllers to the drive units of the drive power converters is carried out by optical fibers. These controllers are equipped with a self-testing facility. If a transmission error is now determined on the basis of the age-induced attenuation of the optical fibers or on the basis of the decreasing transmitter power for example, the appropriate converter unit of the locomotive is turned off or not even taken into operation. This results in a drastic reduction in power of the locomotive or, possibly, even in a standstill.

Figure 2:
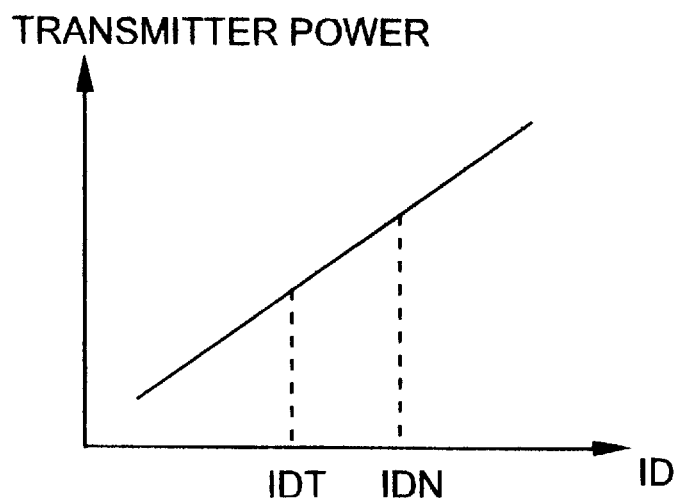
FIG. 2 shows the transmitter power as a function of the transmission current.
Figure 3:
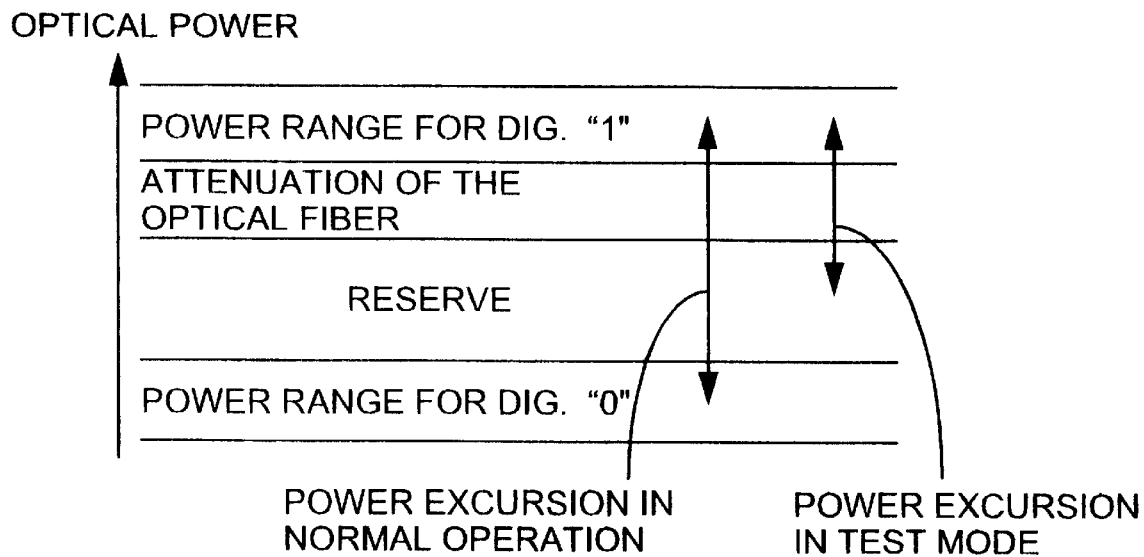
FIG. 3 shows a diagram of the optical power ranges.

It is therefore the aim of the present invention to specify an optical fiber transmission system which can test itself in a simple way for an adequate power reserve. Since the optical transmitter power is a function of the current through the transmitting diode, see FIG. 2 for example, it is enough to modulate the transmission current ID with a prescribed frequency fT. FIG. 3 shows in a diagram how the optical signals are converted into electric output signals of the receiver. A specific optical power range is interpreted in the receiver as a digital "1". A power range situated lower is interpreted as a digital "0". If, because of the high attenuation of the optical fiber or of the reduced power of the transmitter 2, for example, the signal is so weak that a signal corresponding to a "1" falls into the "0" power range, the receiver no longer detects any signals at all, and no more information is transmitted. A sufficiently large power reserve should always be present in order to be able to guarantee reliable operation.

Figure 4:
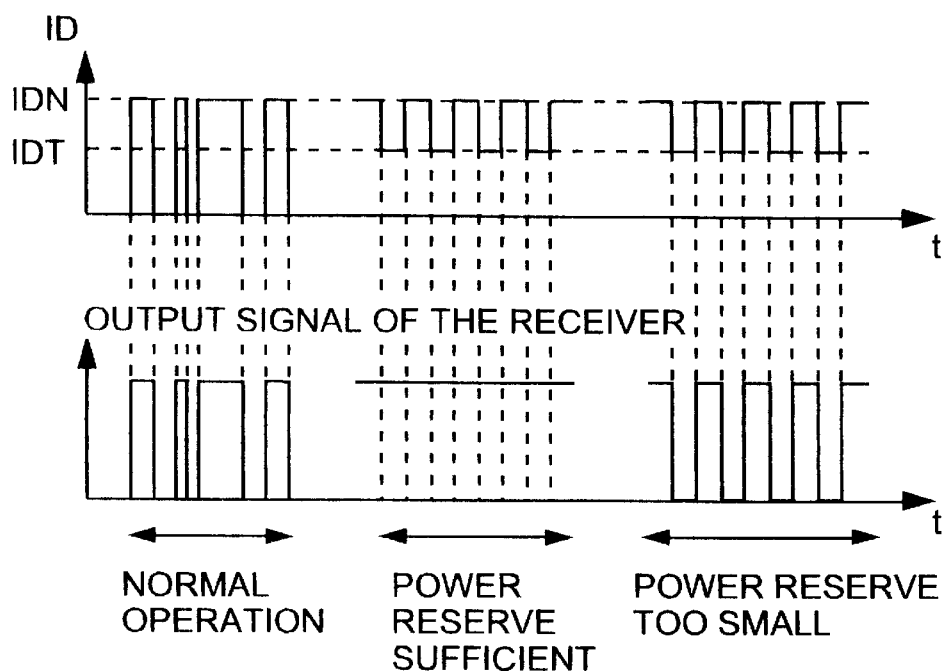
FIG. 4 shows the temporal characteristic of the transmitted and received signals in normal operation and in the test mode.

According to the invention, it can now be tested in a test mode whether this reserve is still present. This is achieved when a test signal is applied in the region of the reserve and an investigation is made as to whether a digital zero (=reserve no longer present) or a digital one (=reserve still present) is detected. This is achieved when for test purposes the current ID is switched over between a normal value IDN and a lower test value IDT (see FIG. 4). In the case which is represented in the middle of FIG. 4, the test signal is not yet so weak that the optical power corresponding to the test current IDT already falls into the "0" range and a digital zero is detected. The power reserve is thus sufficient. In the case which is represented in FIG. 4 on the right, the test signal is, however, already so weak that a digital zero is detected. The power reserve is thus no longer sufficient. The sensitivity or the magnitude of the reserve can be set in this case by an appropriate selection of the test current IDT. Also represented furthermore on the left-hand side of FIG. 4 is the normal operation, in which the excursion of the transmission current ID reaches from zero up to IDN.

Figure 5:
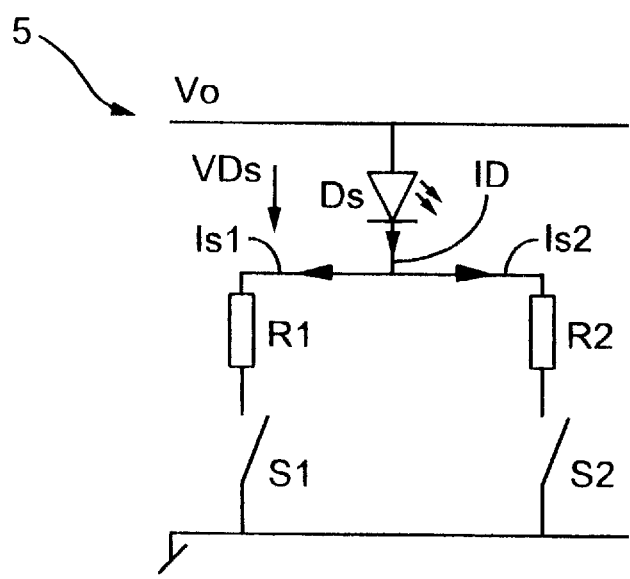
FIG. 5 shows an example of implementation for the supply circuit according to the invention.

FIG. 5 gives an example of a possible realization of the supply circuit 5. A transmitting diode DS is connected, on the one hand, to a supply voltage V0 and, on the other hand, to frame via the parallel circuit of two series circuits of a first resistor R1 and a second resistor R2 and of a first switch S1 and a second switch S2. The switches S1 and S2 are formed, for example, by transistors. In normal operation, the two switches S1 and S2 are clocked synchronously in accordance with the digital signals to be transmitted. As a result, the transmission current ID switches over between a normal value IDN=IS1+IS2 and zero. In the test mode, only one switch, for example S1, is clocked with the prescribed frequency fT, while the other switch is kept continuously closed. As a result, there is an alternation in the test mode between a test current IDT=(V0−VDS)/R1 and the normal current IDN=(V0−VDS)/R1∥R2.

It is now possible by means of an optical fiber transmission system according to the invention to construct a drive control system for an electrically driven locomotive, for example, which is able to test for adequate power reserve: the high-power converters of the drive power converters are equipped with GTOs (gate turn-off thyristors). One power converter normally comprises at least 6 GTOs. In the case of traction power converters having a plurality of individually driven bogies, up to 60 GTOs are therefore used per locomotive. Each of the GTOs requires a drive unit. The drive units are driven, for their part, by a controller which controls the entire power converter and thus the vehicle. The exchange of information between the individual drive units and the controller is carried out by means of optical fibers. Two optical fibers, and thus also two optical fiber transmission systems, are frequently used per drive unit. One optical fiber transmits the control signals from the controller to the respective drive unit; the other optical fiber transmits a check-back signal from the drive unit to the controller.

If one of these subsystems comprising a GTO, an associated drive unit and the two optical fibers exhibits a fault which is detected by the controller from a defective check-back signal, the power converter affected must be switched off. In the case of locomotives which, for example, have only one power converter per bogie, the result is a considerable reduction in the power available.

Virtually all the power converter systems are switched on and off periodically. The same also applies to those of the electrically driven locomotives, for example overnight. This renders it possible to use an optical fiber transmission system according to the invention to determine in a simple way whether adequate power reserve is still available: firstly, the electronic system, that is to say also the controller and the drive units, is supplied with voltage. A test of the optical fiber transmission systems is undertaken before the power converters are supplied with voltage. The check-back signal is modulated, in the manner of the invention, by the drive unit in order to test the optical fiber available for the check-back signal. If the controller does not determine any modulation, the transmission channel still has the reserve required for the check-back signal.

The transmission channel for the control signals is tested as follows: the first control pulse, which terminates the test phase of the check-back signal, is modulated in the manner of the invention. If the transmission channel still has the required reserve, this can be detected from the check-back signal, since the drive unit does not execute any switching operations. If, however, the transmission channel no longer has the required reserve, a digital signal is detected in the receiver of the drive unit and switching pulses are output. This results in another check-back signal, and this fact is detected in the controller. This error detection is indicated and a request is made for an early inspection of the optical fiber transmission system.

The invention has been explained above with the aid of an electrically driven locomotive. However, it is in no way restricted thereto, but can be used for any arbitrary optical fiber transmission system. All that is important is that the test be carried out in a phase during which no signals are being transmitted. Start phases are particularly suitable for this.

It is possible using the invention to construct an optical fiber transmission system which can be checked for functioning in a simple way and without large-scale adaptations of the system. It is also advantageous that reaching an inadequate power reserve is indicated in good time such that there is still sufficient time available for an inspection and no unexpected failure occurs.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An optical fiber transmission system transmitting control signals between a controller and a drive unit comprising:

(a) an opto-transmitter and an opto-receiver, which are connected via at least on optical fiber;

(b) a transmitting diode which is arranged in the opto-transmitter and is driven by a supply circuit which outputs a transmission current; wherein (c) in a test mode of the optical fiber transmission system, the supply circuit switches over the transmission current with a prescribed frequency, in order to check the functioning of the optical fiber transmission system, and wherein the prescribed frequency is between a normal current and a test current which is not equal to zero and lower in absolute value than the normal current.

2. The system of claim 1, wherein at least one optical fiber transmission system is provided between a controller and at least one drive unit of a locomotive drive control system.

3. A method for checking a drive control system, the drive control system comprising at least one controller and one drive unit, which are connected via at least one optical fiber, comprising the steps of: outputting a transmission current, by a supply circuit arranged in an opto-transmitter to supply a transmitting diode DS and switching over the transmission current with a prescribed frequency between a normal current and a test current which is not equal to zero and is smaller in absolute value than the normal current.

* * * * *